United States Patent
Chang et al.

(10) Patent No.: US 7,213,933 B2
(45) Date of Patent: May 8, 2007

(54) DIRECT TYPE BACKLIGHT MODULE OF DIFFUSER PLATE AND ITS MANUFACTURING METHOD THEREOF

(75) Inventors: Jen-Huai Chang, Yongjing Shiang (TW); Jyh Horng Wang, Sansia Township, Taipei County (TW); Chiang Hsing Liu, Yuanli Township, Miaoli County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 62 days.

(21) Appl. No.: 10/839,349

(22) Filed: May 6, 2004

(65) Prior Publication Data
US 2005/0146872 A1 Jul. 7, 2005

(30) Foreign Application Priority Data
Jan. 2, 2004 (TW) .............................. 93100099 A

(51) Int. Cl.
*G09F 13/04* (2006.01)

(52) U.S. Cl. ........................................ 362/97; 362/606

(58) Field of Classification Search .................. 362/97, 362/33, 359, 812
See application file for complete search history.

(56) References Cited

U.S. PATENT DOCUMENTS

| | | | |
|---|---|---|---|
| 6,755,545 B2* | 6/2004 | Lee | 362/616 |
| 6,913,373 B2* | 7/2005 | Tanaka et al. | 362/268 |
| 2003/0184993 A1* | 10/2003 | Yamada | 362/31 |

* cited by examiner

*Primary Examiner*—Renee Luebke
*Assistant Examiner*—Julie A. Shallenberger
(74) *Attorney, Agent, or Firm*—Rosenberg, Klein & Lee

(57) ABSTRACT

A direct type backlight module with a diffuser plate and its manufacturing method for application to an LCD TV is provided. The diffuser plate has a plurality of columnar lenticular lens surfaces for scattering incident light to increase its light uniformity and reducing the quantity of light dispersant in the diffuser plate in the range of from 30% to 50% to increase light transmission ratio. Through the use of vertical or horizontal lenticular lenses of at least one columnar lenticular lens surface the diffusion degree in every direction is adjusted.

4 Claims, 9 Drawing Sheets

DIRECT TYPE BACKLIGHT MODULE OF DIFFUSER PLATE AND ITS MANUFACTURING METHOD THEREOF

BACKGROUND OF THE INVENTION

1. Field of the Invention

The present invention relates to a direct type of backlight module with a diffuser plate and the manufacturing method thereof, which provides a diffuser plate having a plurality of columnar lenticular lens surfaces for scattering light to provide a uniform and stable panel of a backlight module.

2. Description of the Related Art

A backlight module, is also called a backlight plate, and provides the light for an LCD panel, the emitting light source for which must have the characteristics of high brightness and a long lifespan. The light sources currently used include Cold Cathode Fluorescent Lamp (CCFL), Hot Cathode Fluorescent Lamp, Light Emitting Diode (LED), Electroluminescent panel (EL), of which the CCFL is the most widely used and is of two types, a direct type and a side type.

An LCD has been used in personal information products for close distance use; therefore, requiring a brightness in an approximate range of from 250 to 350 nits. In order to match the requirement for TV long distance viewing, a brightness requirement will be over 500 nits. Because liquid crystals are a self-luminescent material, a light source from a lamp is required. A product under 20" adopts side light sources, and enhances light uniformity and efficiency by use of a diaphragm of a light guide plate and prism sheet, using 2 to 8 lamp tubes. Because the criteria of brightness and non-visual loss for an LCD TV are higher, a direct type light source becomes the mainstream for large monitor and large TV.

Moreover, the large LCD applications are mainly for notebook PCs and LCD Monitors, that require the characteristics of a backlight module that emphasizes lightweight, thin shape, and small volume. Relatively, while developing a backlight for an LCD TV, the required criteria was developing a brightness of at least over 450 cd/m2, broad viewing angle (current selling products achieving 170 degrees), fresh image contrast (current LCD TV have about 500:1; PDP of about 1000:1), and a suitable lifespan criteria (current product test value is about 60 thousand hours). Based on the above aforementioned criteria, the direct type backlight module has become the technology mainstream for large LCD TV applications. The primary concept of its design is to satisfy the requirement of higher brightness. The illumination module is that of a side light which was used for reducing weight and thickness of the illumination module, where light is scattered uniformly by a direct type light and transformed into a flat light source to enter into the liquid crystal panel. The product structure of a "direct type backlight module" is showing as FIG. 1, which is a structural diagram of a direct type backlight module of the prior art. The direct type backlight module 1' comprises of a reflector 10', a plurality of light sources 20', and a diffuser 30'. Referring to FIG. 1A., which is a diagram illustrating light moving within the prior art diffuser plate, showing that when the light enters into the diffuser plate 30' and contacts a plurality of light dispersant bodies 32' within said diffuser plate 30', the light is subject to non-directional scattering, and is even absorbed by light dispersant bodies 32'.

The characteristics of the technology of the direct type module is as follows:

1. Low Uniformity

The reason is that while using a direct type backlight module is to satisfy the requirement of high brightness, while the size of the module is consideration for relative sacrifice. Therefore, more lamp tubes are used and tend to cause a situation of light and dark stripes, and have a certain influence on uniformity.

2. Thick Module Thickness

Although more lamp tubes increase luminance, the thermal energy resulting from the lamp tubes are relatively high, which can easily cause a change in color under different color temperatures to high sensitivity liquid crystal molecules and color photo resist. Direct type backlight modules usually have a deepened thickness to adjust their depth to match the specification requirements corresponding to the number of lamp tubes and whole luminance.

3. High Light Efficiency

Direct type backlights avoid the side light which causes, in part, light loss and side smear light, and using an aluminum backing plate to reflect stray light to the output windows enhances the whole light energy efficiency.

4. Fewer Assembly Parts Category

It can be observed from FIG. 1 that there is no use of a light guide plate of the side backlight module. Because the function of a light guide plate in the side backlight module is to generate repetitive reflection of a side CCFL light source or LED point light sources by using a dot pattern structure on the light guide plate to derive a uniform light source, direct type light is injected from below, and only requires the diffuser to accomplish uniformity without a light guide plate being included. As for use of a prism sheet part, after increasing the number of lamp tubes and strengthening luminance, removal of the prism sheet can be considered to avoid viewing angle limitations after focusing the light and considering the specification requirements of viewing angle applied to large panels, especially for LCD TVs. On the whole, a direct type backlight module requires less assembly parts than a side type one, but the number of CCFLs is relatively larger.

The direct backlight module is an important device for uniform scattering of light that uses a diffuser plate to replace the light guide plate of a side type light source. The diffuser plate provides light scattering as its primary function, such as in a light box, and light signboard (even a light box used for X-ray examination in a hospital) all use a similar diffuser plate to scatter light uniformly. However, while the diffusion efficiency of early diffuser plates fit the requirement, the light transmission ratio and uniformity is still not enough to use for display applications, having the defect of insufficient brightness. Generally speaking, the transmission rate of the whole light area of these diffuser plates is in a range of from 30% to 50% and that already does not satisfy the requirements, of high brightness for a display. Japanese diffuser plate manufacturers have recently been devoted to solving these defects, by adding different categories of light dispersants and under strict controls of the process, the light transmission efficiency and uniformity have been successfully improved. Although transmission rate has increased in a range from 50% to 70%, the greater transmission rate requirement for LCDs has not satisfied consumers, besides, the cost of light dispersant material still remains high.

Therefore the direct type is the only choice for backlighting of an LCD TV because the characteristics of LCD TV require high uniformity and high efficiency of light diffusion effect to provide stable and uniform light for the liquid crystal panel. The required technology must emphasize high transmission rate and high diffusion of the diffuser plate nowadays.

Therefore, a direct type backlight module with a diffuser plate and its manufacturing method are proposed to solve the defects of low transmission rate and low diffusion caused from too much conventional light dispersant material.

SUMMARY OF THE INVENTION

It is an object of the present invention to provide a structure of a direct type backlight module with a diffuser plate and its manufacturing method, wherein a direct type backlight module is provided. The direct type backlight module employs a plurality of columnar lenticular lenses on a surface of a diffuser plate to scatter an incident light to an emitting light through the diffuser plate to achieve a high uniformity and high transmission light for an LCD TV.

It is another object of the present invention to provide a structure of a direct type backlight module with a diffuser plate and its manufacturing method, wherein a direct type backlight module is provided and the direct type backlight module employs a plurality of columnar lenticular lens surfaces on a diffuser plate. Employing the diffuser plate enables the amount of light dispersant material to be reduced to enhance its light transmission rate, besides, the manufacturing cost is reduced due to the amount of light dispersant being reduced.

It is yet another object of the present invention to provide a structure of a direct type backlight module with a diffuser plate and its manufacturing method, wherein a direct type backlight module is provided and the direct type backlight module employs a plurality of columnar lenticular lens surfaces on two surfaces of the diffuser plate. Through vertical or horizontal lenticular lenses of the two sides of the diffuser plate to adjust the degree of diffusion of the emitted light in every direction and to control light scattering to some direction that can match the different requirement and design for a display.

It is still yet another object of the present invention to provide a structure of a direct type backlight module with a diffuser plate and its manufacturing method, wherein a manufacturing method of direct type backlight module is provided. Through the use of extruding, casting, or coating to form the direct type backlight module with a diffuser plate, a simple and low-cost manufacturing method is provided.

In order to perform the aforementioned purposes, efficiency and the characteristics of each, the present invention provides a structure of a direct type backlight module with a diffuser plate and its manufacturing method suitable for application to an LCD TV. Manufacture of the direct type backlight module with a diffuser plate having a plurality of columnar lenticular lenses on a surface of the diffuser plate to scatter an incident light provides an increase in light uniformity and reduces the amount of the light dispersant in a range of from 30% to 50% to enhance light transmission rate. Besides, through vertical or horizontal lenticular lenses on two sides of the diffuser plate to adjust the diffusion degree in every direction. The manufacturing method of the present invention does not increase the complexity of the fabrication, but is a benefit thereto.

DETAILED DESCRIPTION OF THE PREFERRED EMBODIMENTS

In order to clearly express and explore the features, characteristics and efficiency of the present invention, the preferred embodiments and detailed description are described as follows.

The present invention solves the problem of the high cost of light dispersant material which is used in prior art diffuser plates. The present invention provides an increase in the light diffusion value, while reducing, in a range of from 30% to 50%, the quantity of light dispersant used. Not only transmission rate is increased, which is a characteristic associated with absorption or reflection by the light dispersant, but also the manufacturing cost is reduced and light reflected from the light dispersant is subject to an irregular scattering effect. The structure of the diffuser plate of the present invention can control light scattering in directions that can match the different requirements and design for display devices.

Figure 1:
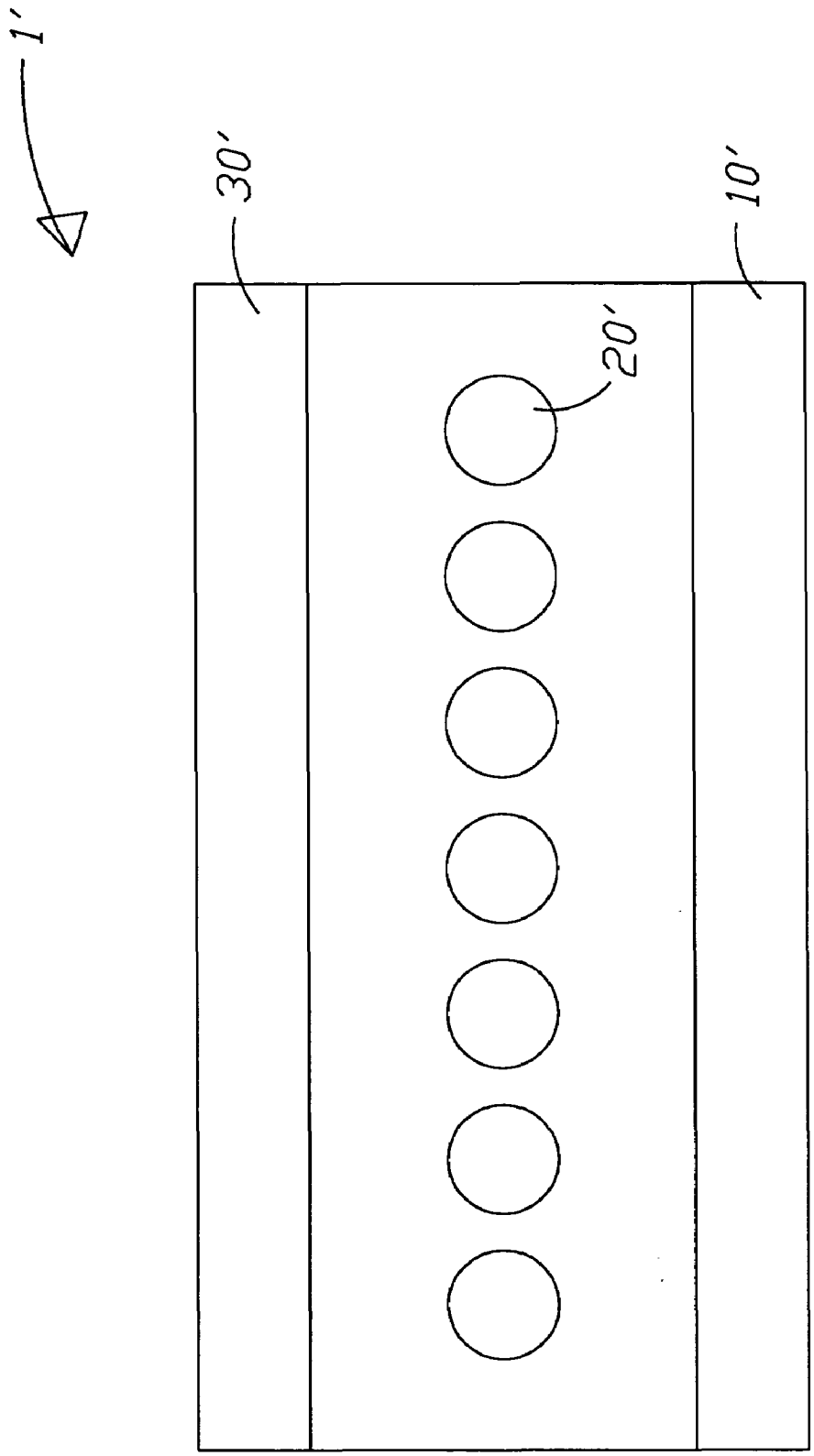
FIG. 1 is a sectional view showing a direct type backlight module of the prior art.
Figure 1A:
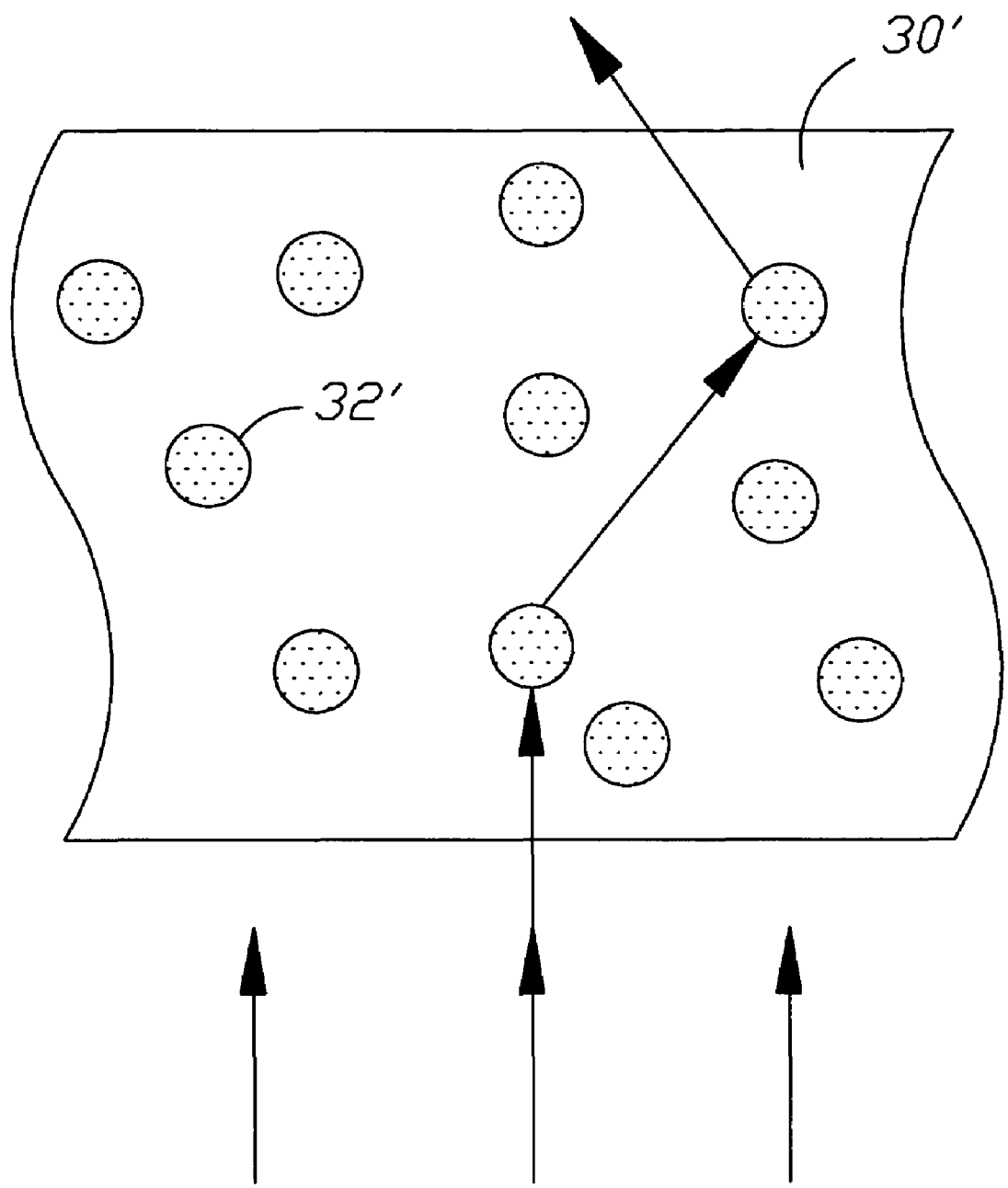
FIG. 1A is diagram illustrating light passage within a diffuser plate of the prior art.
Figure 2:
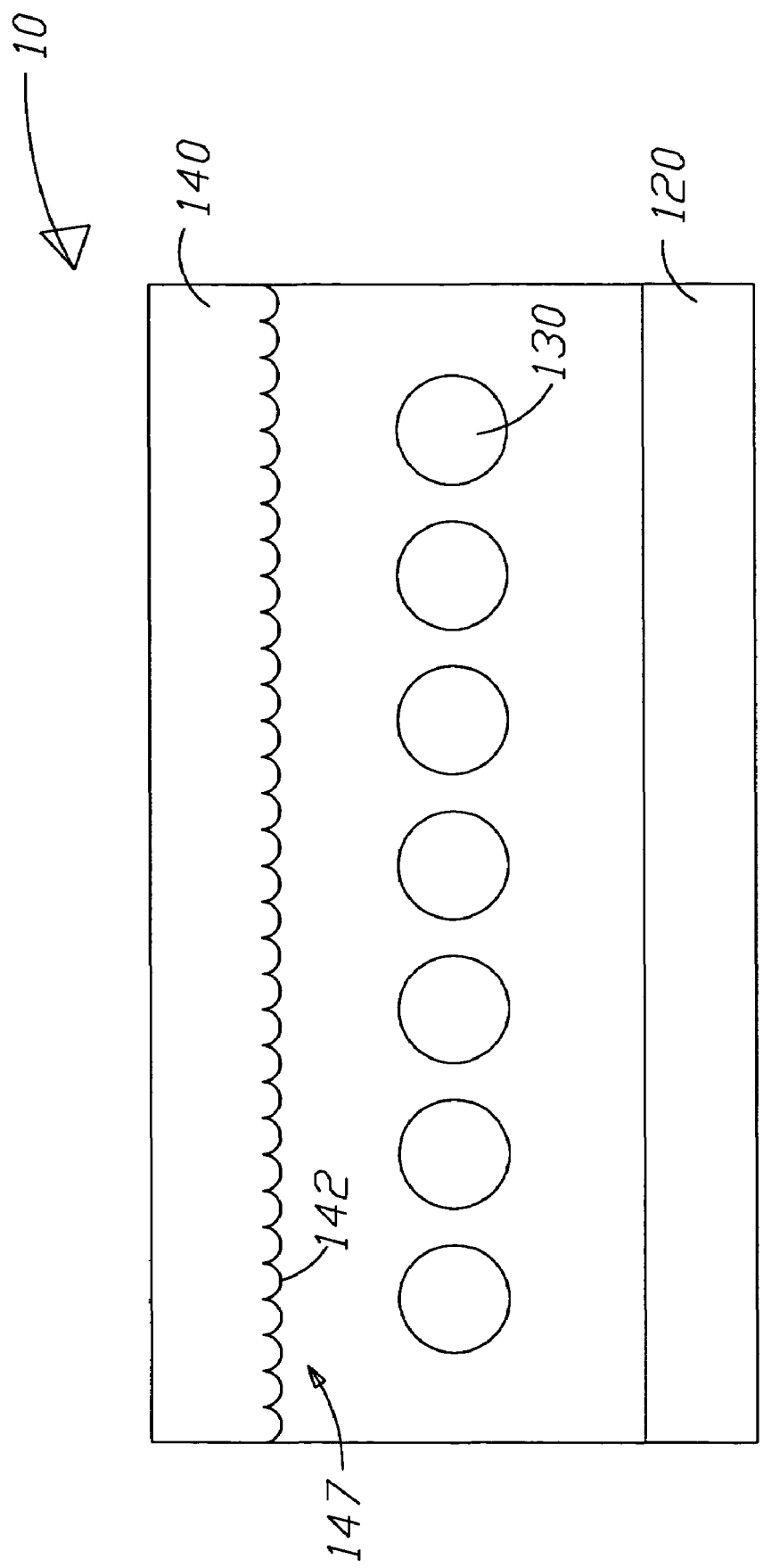
FIG. 2 is a sectional diagram showing a direct type backlight module of an LCD TV of a preferred embodiment of the present invention.

Refer to FIG. 2, which illustrates the structural diagram of one of the preferred embodiments of a direct type backlight for an LCD TV. As FIG. 2 shows, the main structure of the direct type backlight module 10 consisting of a reflector 120, a plurality of light sources 130, and a diffuser plate 140 located above the light sources 130 and having at least a wavy surface 142. Incident light injected into the diffuser plate 140 is enabled to be scattered and uniformity dispersed through the diffuser plate 140 having a plurality of columnar lenticular lens surfaces 142. The diffuser plate material is selected from one of acrylic resin, epoxy resin, transparent heat hardening resin or UV hardening resin.

Figure 2A:
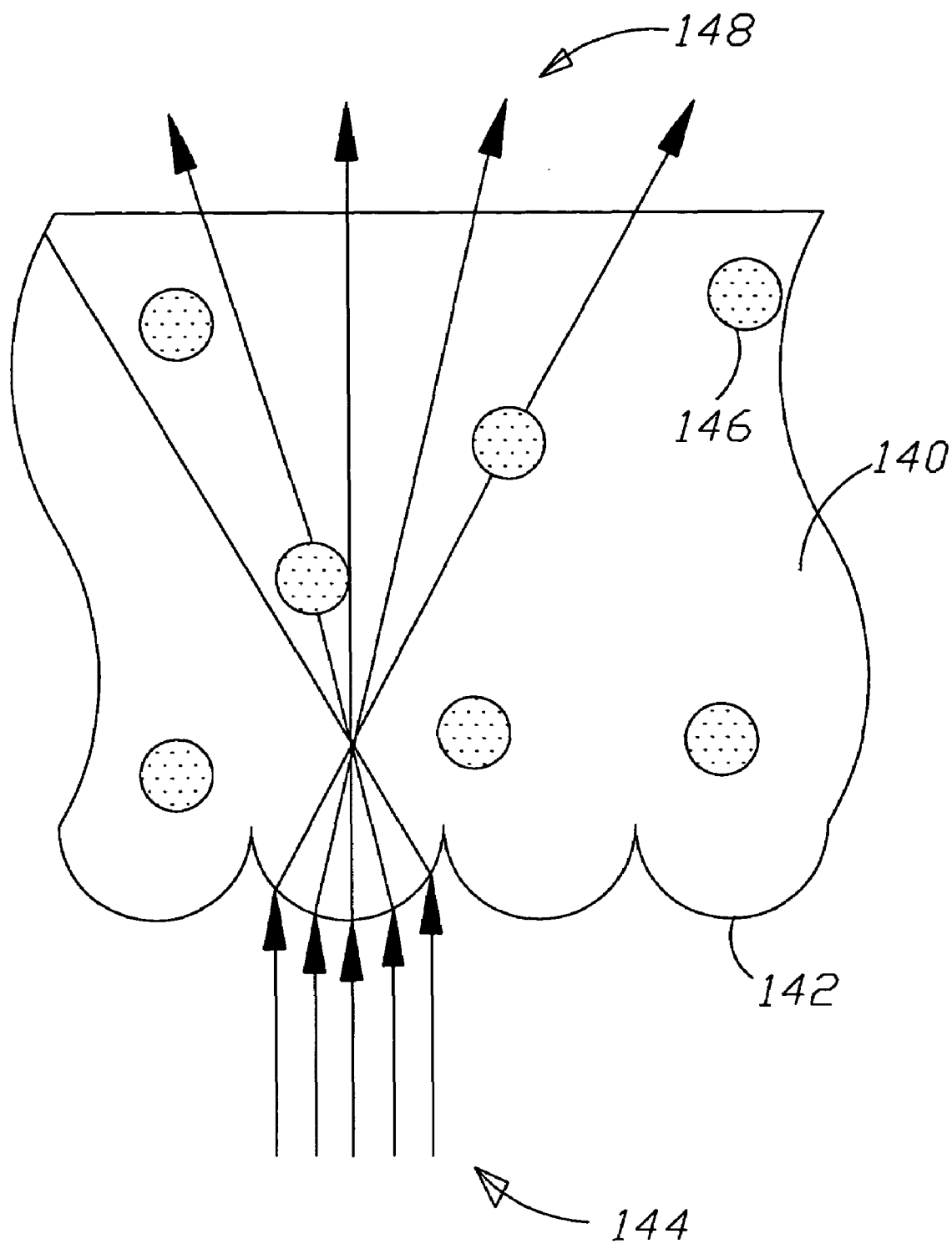
FIG. 2A is a diagram illustrating light entering into the diffuser plate of a preferred embodiment of the present invention.

Referring to FIG. 2A, a diagram illustrating passage of light injected into the diffuser plate of one of the preferred embodiments of the present invention is shown. While incident light 144 is injected into the diffuser plate 140 through the columnar lenticular lens surfaces 142, the incident light 144 is thereby subjected to the effect of scattering, then through a plurality of light dispersant bodies 146 to increase the effect of diffusion, which results in emitted light 148 having a diffusion effect. Therefore, the incident light 144 is injected into the diffuser plate 140 and is scattered, while the light dispersant bodies 146 increases the diffusion effect.

Figure 3A:
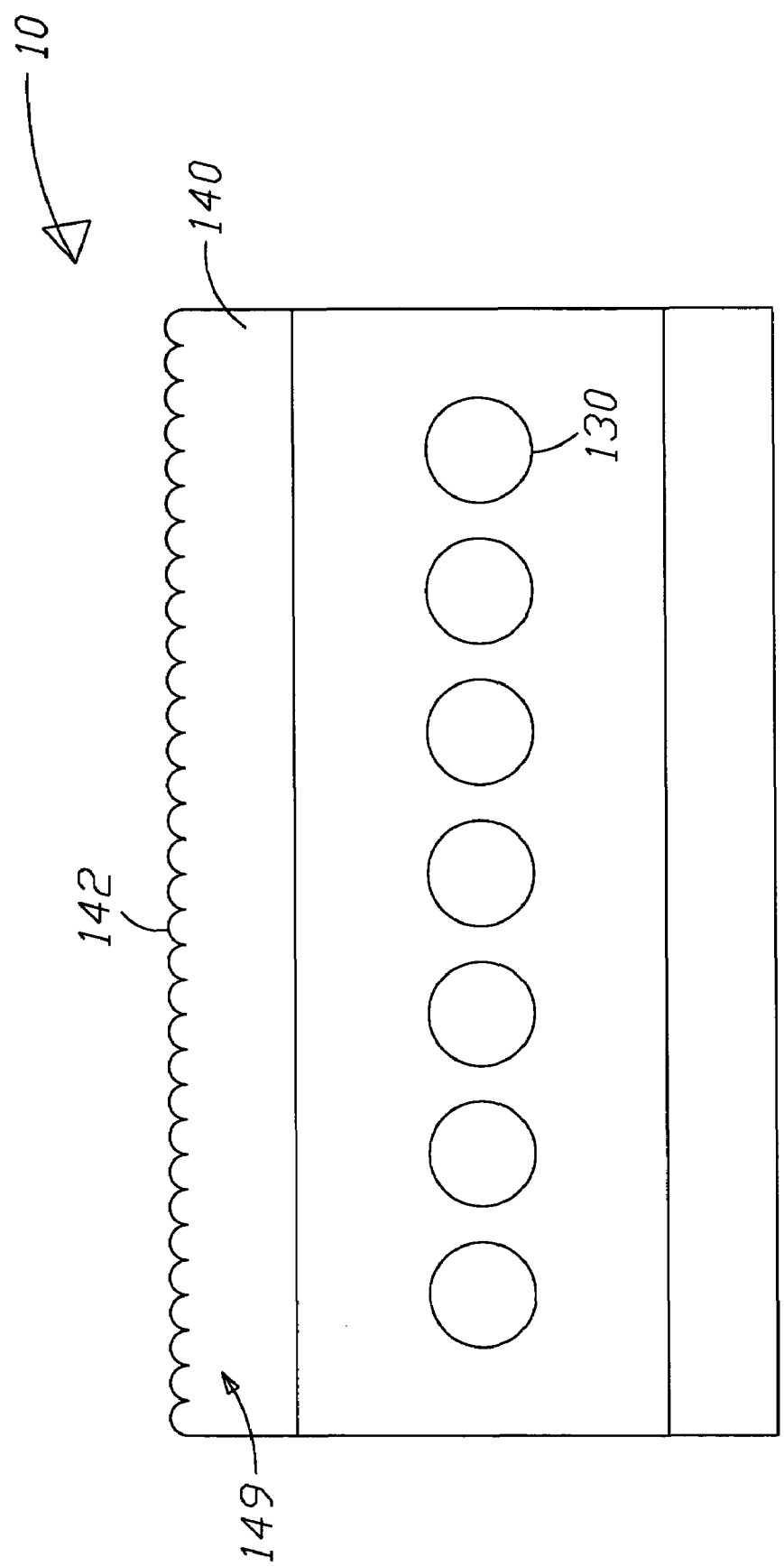
FIG. 3A is a sectional view of a diffuser plate of a preferred embodiment of the present invention.
Figure 3B:
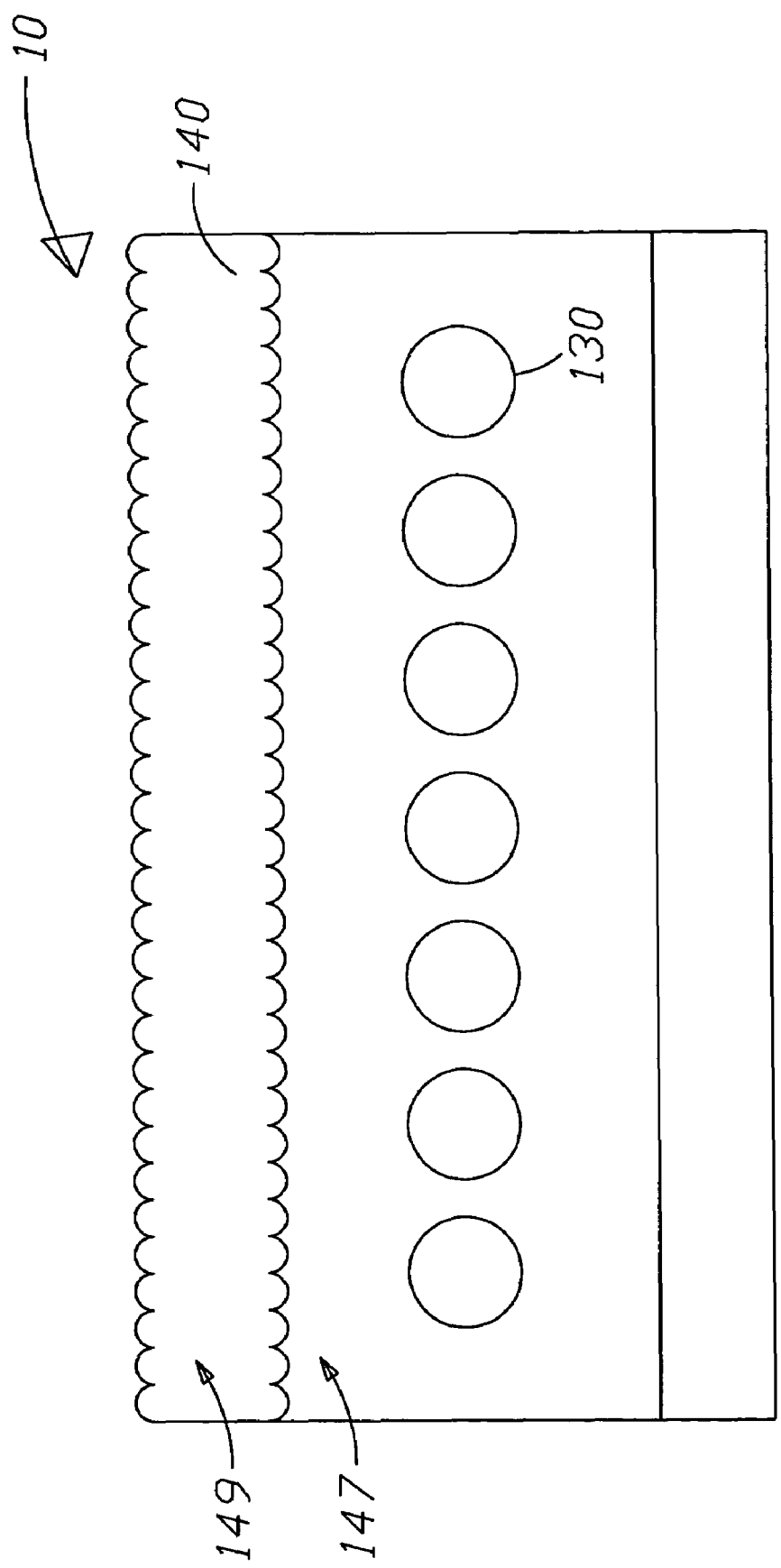
FIG. 3B is a sectional view of a diffuser plate of another preferred embodiment of the present invention.

FIG. 3A and 3B illustrate structural diagram of two other of the preferred embodiments of the diffuser plate. The diffuser plate 140 of the direct type backlight module of the present invention is applied for use in an LCD TV having a plurality of columnar lenticular lens surfaces 142 located above the light sources 130. As shown in FIG. 3A, the plurality of columnar lenticular lens surfaces 142 can be located on the exit facet 149 of the diffuser plate 140. In addition, as shown in FIG. 3B, the columnar lenticular lens surfaces 142 can be located on both the entrance facet 147 and the exit facet 149 of said diffuser plate 140.

Figure 4A:
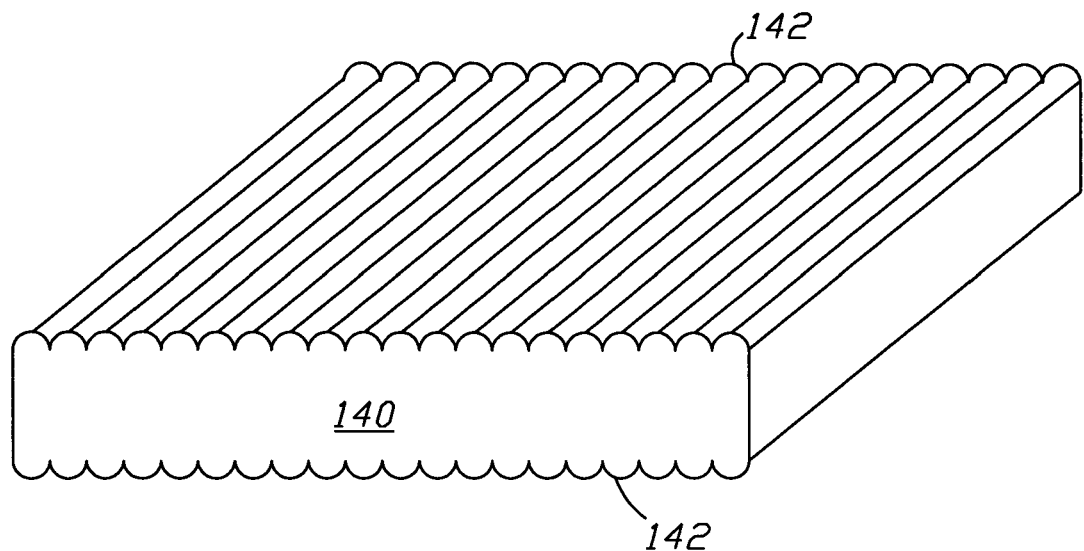
FIG. 4A is a perspective view of a diffuser plate of a preferred embodiment of the present invention.
Figure 4B:
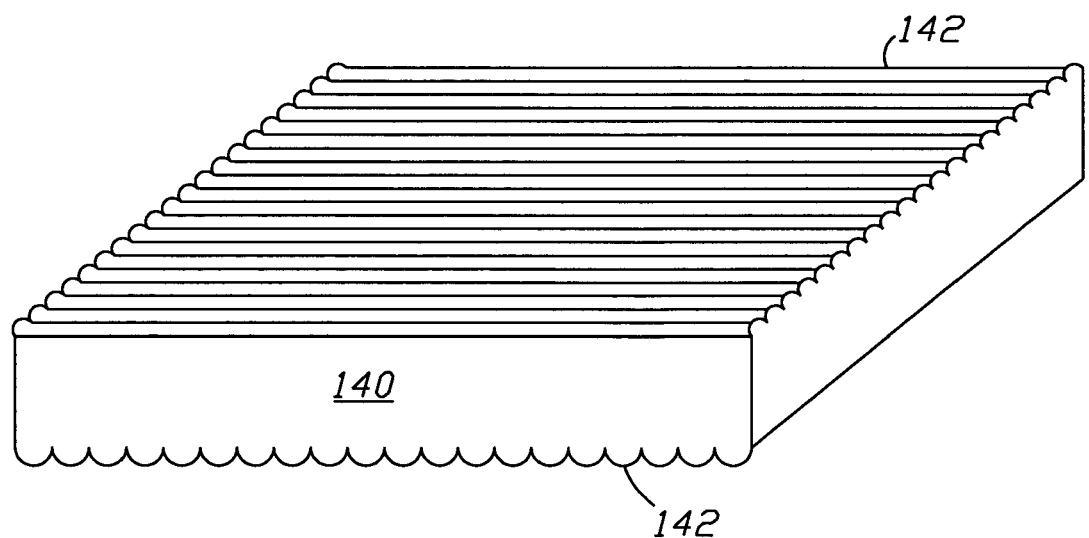
FIG. 4B is a perspective view of a diffuser plate of another preferred embodiment of the present invention.

In addition, referring to FIG. 4A and 4B, a perspective view of the diffuser plate of two further preferred embodiments are shown. The columnar lenticular lens surfaces 142 of said diffuser plate 140 can be located on the entrance facet 147 or exit facet 149 of said diffuser plate, as illustrated in FIG. 2 and FIG. 3A. With respect to the embodiments of FIGS. 4A and 4B, when the diffusion light is to be controlled to scatter to some direction, the columnar lenticular lenses can be presented in vertical or horizontal orientations, located on the two side of said diffuser plate 140.

Figure 5A:
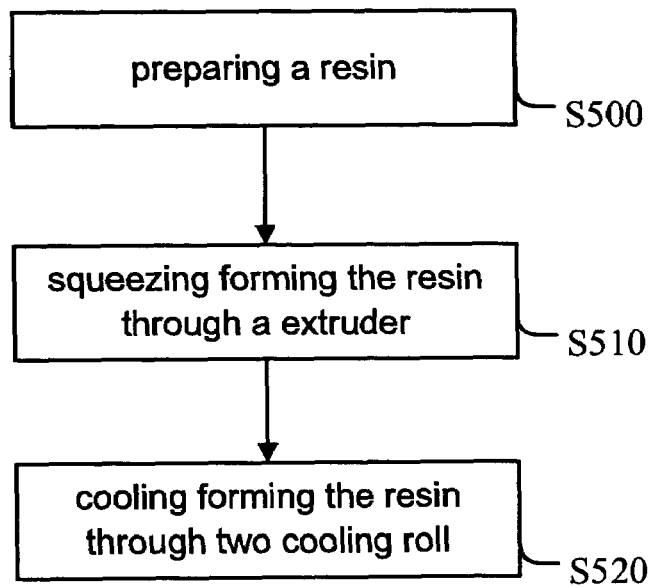
FIG. 5A is a manufacturing flow chart of a diffuser plate of a preferred embodiment of the present invention.

Referring now to the manufacturing flow chart of FIG. 5A, the manufacturing method for a diffuser plate of a direct type backlight module is illustrated. The diffuser plate manufacturing method includes the steps of:

Step 500: preparing a resin;
Step 510: squeezing, forming the resin through an extruder; and
Step 520: cooling the formed resin through two cooling rollers.

In step 520, the two cooling rollers may comprise at least one cooling roller having a plurality of columnar lenticular lens surface impressions. While forming the resin, a plurality of columnar lenticular lens surfaces are formed.

Figure 5B:
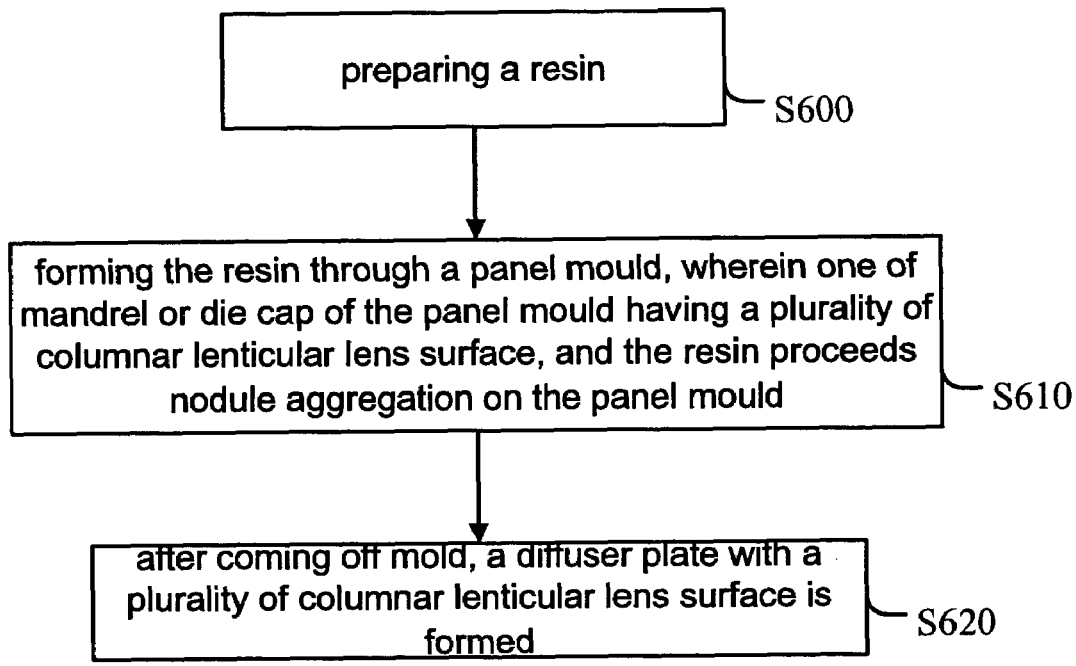
FIG. 5B is a manufacturing flow chart of a diffuser plate of another preferred embodiment of the present invention.

Referring to FIG. 5B, a manufacturing method for a diffuser plate of another preferred embodiment is illustrated. The diffuser plate manufacturing method for a direct type backlight includes the steps of:

Step 600: preparing a resin;
Step 610: forming the resin through a panel mold, wherein one mandrel or die cap of the panel mold has a plurality of columnar lenticular lens surface impressions formed therein, and the resin proceeds with nodule aggregation on the panel mold; and
Step 620: after removal from the mold, a diffuser plate with a plurality of columnar lenticular lens surfaces is thus formed.

In step 620, both said mandrel and die cap may have a plurality of columnar lenticular lens surfaces to form two side of diffuser palate with a plurality of columnar lenticular lens surfaces.

Figure 5C:
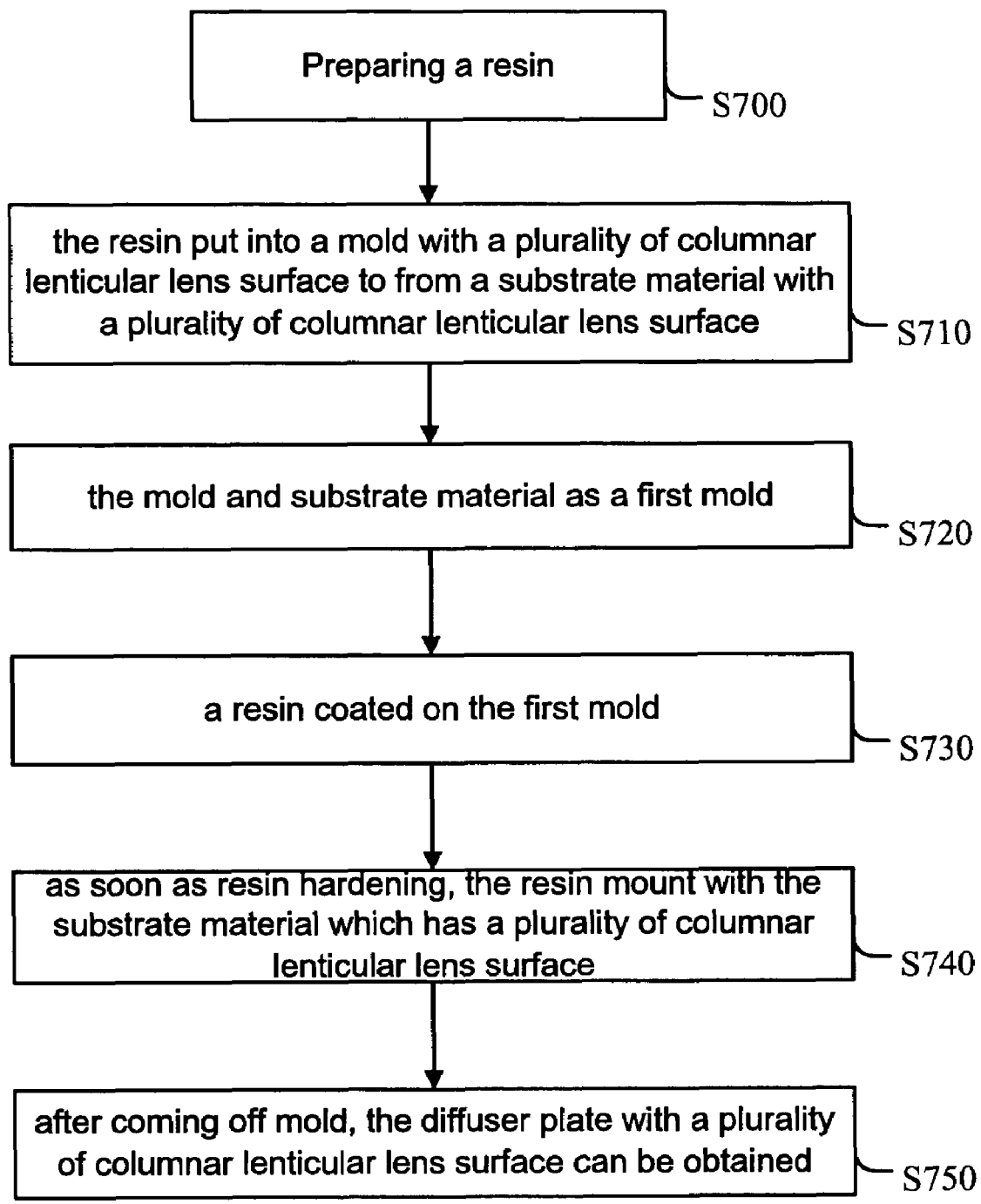
FIG. 5C is a manufacturing flow chart of a diffuser plate of another preferred embodiment of the present invention.

Refer now to FIG. 5C, a manufacturing flow chart for a diffuser plate of another preferred embodiment. This manufacturing method includes the steps of:

Step 700: preparing a resin;
Step 710: the resin is put into a mold with a plurality of columnar lenticular lens surface impressions to from a substrate material with a plurality of columnar lenticular lens surfaces;
Step 720: the mold and substrate material define a first mold;
Step 730: a resin is coated on the first mold;
Step 740: as soon as the resin completes hardening, the resin mount with the substrate material, which has a plurality of columnar lenticular lens surfaces is obtained; and
Step 750: after removal from the mold, the diffuser plate with a plurality of columnar lenticular lens surfaces can be obtained.

The diffuser plate manufacturing method for a two-sides with columnar lenticular lens surfaces, the method repeats from step 700.

While certain preferred embodiments of the present invention have been disclosed in detail, it is to be understood that various modifications may be adopted without departing from the spirit of the invention or scope of the following claims.

What is claimed is:

1. A direct type backlight module with a diffuser plate comprising:
   a reflector;
   a plurality of lamp tubes disposed above said reflector; and
   a single one-piece diffuser plate located directly above said plurality of lamp tubes, said diffuser plate having (a) a plurality of light dispersant bodies contained therein and distributed therethrough, and (b) a plurality of columnar lenticular lenses on at least a surface of said diffuser plate facing said plurality of lamp tubes, each columnar lenticular lens having a cylindrical surface thereof facing said plurality of lamp tubes;
   wherein incident light passing through said diffuser plate is scattered through said plurality of columnar lenticular lenses on said surface of said diffuser plate to an LCD to provide a uniformly diffused emitted light having a high transmission ratio.

2. The direct type backlight module in accordance with claim 1, wherein said columnar lenticular lenses are disposed on opposing surfaces of said diffuser plate.

3. The direct type backlight module in accordance with claim 2, wherein said columnar lenticular lenses of said opposing surfaces of said diffuser plate define one of horizontal facets or vertical facets.

4. The direct type backlight module in accordance with claim 2, wherein said columnar lenticular lenses on one of said opposing surfaces of said diffuser plate define vertical facets and the columnar lenticular lenses of the other of said opposing surfaces define horizontal facets.

* * * * *